UNITED STATES PATENT OFFICE.

WILHELM HERZBERG AND WALTER BRUCK, OF SCHÖNEBERG, NEAR BERLIN, GERMANY, ASSIGNORS TO ACTIEN GESELLSCHAFT FÜR ANILIN FABRIKATION, OF BERLIN, GERMANY.

VAT DYE OF THE ANTHRAQUINONE SERIES.

993,992.

Specification of Letters Patent. Patented May 30, 1911.

No Drawing. Application filed January 30, 1911. Serial No. 605,610.

*To all whom it may concern:*

Be it known that we, WILHELM HERZBERG and WALTER BRUCK, subjects of the Emperor of Germany, residing at Schöneberg, near Berlin, Germany, our post-office addresses being Landshuterstrasse 24 and Neue Culmstrasse 5ª, respectively, Schöneberg, near Berlin, Germany, have invented certain new and useful Improvements in New Vat Dyes of the Anthraquinone Series, of which the following is a specification.

According to our present invention new dyes of the anthraquinone series can be manufactured which contain sulfur and dye cotton without a mordant in a suitable vat; the invention is based on the observation that such dye-stuffs may be obtained by acting with sulfur on a benzyl or benzylidene derivative of alpha-aminoanthraquinone or of a derivative thereof (except an amino derivative) or of a beta-aminoanthraquinone or of a derivative thereof, or on a derivative of such a benzyl or benzylidene compound. The reaction may be carried out in the presence or not of a suitable indifferent body.

We assume that the reaction which occurs in manufacturing the new dyes consists in the formation of a "thiazole" body so that for instance the dye formed by the action of sulfur on benzyl-beta-aminoanthraquinone:

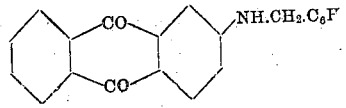

or on benzylidene-beta-aminoanthraquinone:

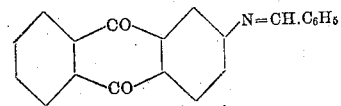

may probably possess the following constitution:

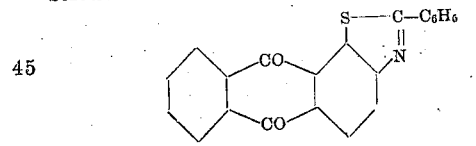

As to the tints produced by the new dyes, very clear and intense shades of a very good fastness may be obtained with the new products of our present invention which shades vary from yellow to orange to brown.

As to the production of the parent materials for the new manufacture, these may be obtained by acting with benzaldehyde or with a benzyl halid or a benzal halid or a derivative of one of these bodies on alpha-aminoanthraquinone or a derivative thereof (except an amino derivative) or a beta-aminoanthraquinone or a derivative thereof. It may also be stated that it is not necessary to isolate the parent material thus obtained which is to be used in the new manufacture; in any suitable case the formation of the benzylidene or benzyl compound may be combined with the production of the new sulfur compound in one operation.

In giving hereafter an example for the manufacture of the parent material we wish to state that we do not claim any manufacture relating to this parent material.

A mixture of 50 parts of beta-aminoanthraquinone and 50 parts of benzaldehyde is gradually heated until the aldehyde boils. When the evolution of water vapor has ceased the mass is distilled in a vacuum in order to eliminate the excess of benzaldehyde. The benzylidene-beta-aminoanthraquinone is thus obtained in a pure state as a yellow body melting at 189° C. It dissolves in concentrated sulfuric acid to a yellow solution; it is difficultly soluble in alcohol, more soluble in benzene and easily soluble in glacial acetic acid. Other benzylidene derivatives of beta-aminoanthraquinone or of a derivative of a beta-aminoanthraquinone may be correspondingly obtained. Thus may be produced, for instance, the mono-benzylidene-derivative of 2.6-diaminoanthraquinone, which melts at about 240-250° C. and is an orange-yellow powder. Likewise the mono-benzylidene-2.7-diaminoanthraquinone may be obtained by acting with benzaldehyde in corresponding proportion on 2.7-diamino-anthraquinone; this new benzylidene-derivative melts at about 140° C. and is a brownish yellow powder soluble in concentrated sulfuric acid to a yellow solution. Furthermore, the benzyl derivative of beta-aminoanthraquinone may be obtained by acting with benzyl-chlorid upon beta-aminoanthraquinone. This new product is a yellow powder melting at about 275° C. which dissolves in concentrated sulfuric acid to a yellow solution. Other benzyl derivatives of beta-aminoanthraquinones or of alpha-aminoanthraquinone may be obtained in a like manner.

In order to illustrate our invention, we give the following examples, the parts being by weight:

(1.) 104 parts of benzylidene-beta-aminoanthraquinone, obtained for instance by acting on beta-aminoanthraquinone with benzaldehyde according to the above given recipe, are heated together with 22 parts of sulfur; the temperature is maintained at about 220–230° C. until the evolution of hydrogen sulfid ceases. The mass, after cooling, is well powdered and the excess of sulfur and some unaltered benzylidene compound eliminated from the mass by extracting it with chlorobenzene. The new dyestuff remains as a yellow powder which is either very difficultly soluble or insoluble in the usual solvents. In concentrated sulfuric acid it dissolves to a yellow solution. With hydrosulfite and soda-lye it produces a red vat which dyes cotton without a mordant red-brown tints which on ageing change to a very clear and intense yellow of very good fastness.

(2.) 41.4 parts of dibenzylidene-2.6-diaminoanthraquinone, which may be obtained by heating 2.6-diaminoanthraquinone with benzaldehyde with or without the addition of a suitable solvent, such as naphthalene, are dissolved in about 50 parts of naphthalene together with 50 parts of sulfur; the mass is heated to 220–225° C. until the evolution of hydrogen sulfid ceases. Toward the end of the reaction, even at a high temperature, the product separates partly in a crystalline form. In order to isolate the product the cooled mass is powdered and suitably extracted, for instance by boiling it with alcohol and then with carbon bisulfid.

The new dyestuff is thus obtained in the shape of brilliant yellow crystals forming small leaves which melt above 300° C.; if pulverized it forms a yellow powder which is more or less difficultly soluble in benzene, nitrobenzene, dichlorobenzene and glacial acetic acid to a yellow solution and which is soluble in anilin to a brown solution, whereas it dissolves in concentrated sulfuric acid to a yellow solution from which solution by the addition of ice are separated yellow flakes. The new dye dissolves easily in hydrosulfite and soda-lye yielding a violet-red vat from which cotton is dyed a dark violet shade which on ageing changes to an intense and clear yellow which possesses a very good fastness.

It is obvious to those skilled in the art that our present invention is not limited to the foregoing examples or to the details given therein. Thus for instance instead of the monobenzylidene or monobenzyl derivative of beta-aminoanthraquinone the corresponding derivative of alpha-aminoanthraquinone may be employed as parent material for our invention. Furthermore, for the monobenzyl or dibenzyl or dibenzylidene derivative of 2.6- or 2.7-diaminoanthraquinone a mixture of the respective mono or disubstituted derivatives of these two amino compounds may be substituted thus obtaining a mixture of several thiazole-dyes which may be directly used for dyeing purposes. Finally derivatives of alpha-aminoanthraquinone (except amino derivatives) or of beta-aminoanthraquinone may be employed in preparing the parent material of our invention and the benzyl or benzylidene derivatives of such derivatives of aminoanthraquinones may be used in carrying out the process underlying our present invention.

Having now described our invention and the manner in which it may be performed what we claim is,—

1. As new articles of manufacture new vat dyes of the anthraquinone series possessing a so-called "thiazole" nucleus, the simplest member of this new class of dyes having the following formula:

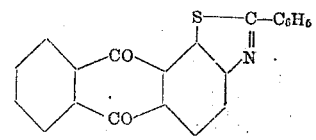

which new dyes give by means of hydrosulfite and an alkali, generally speaking, a bluish red vat, from which clear and intense shades of a very good fastness are obtained which shades, generally speaking, vary from yellow to orange to brown, these new dyes being in the pulverized shape yellow to brown powders which are difficultly soluble in benzene, nitrobenzene, dichlorobenzene and anilin, giving a yellow to brown colored solution, and which new dyes dissolve in concentrated sulfuric acid, generally speaking, to a greenish-yellow to yellow to brown solution from which solution by the addition of ice yellow flakes are separated.

2. As a new article of manufacture the new vat dye of the anthraquinone series containing a so-called "thiazole" nucleus which new dye can be obtained by acting with sulfur in the presence of naphthalene upon dibenzylidene-2.6-diaminoanthraquinone, this new dye being 6-benzylideneaminoanthraquinone-1.2-phenylthiazole, which new dye produces on cotton from a suitable vat a very clear and intense yellow shade of a very good fastness, and this new dye being in the pulverized shape a yellow powder melting above 300° C. which dye is more or less difficultly soluble in benzene, nitrobenzene, dichlorobenzene and glacial acetic acid to a yellow solution and soluble in anilin to a brown solution, this new dye dissolving in concentrated sulfuric acid to a yellow solution, from which solution by the addition of ice yellow flakes are separated.

In testimony whereof we have hereunto set our hands in presence of two subscribing witnesses.

WILHELM HERZBERG.
WALTER BRUCK.

Witnesses:
 HENRY HASPER,
 WOLDEMAR HAUPT.